(12) United States Patent
Lee et al.

(10) Patent No.: US 11,685,402 B2
(45) Date of Patent: Jun. 27, 2023

(54) AUTONOMOUS DRIVING APPARATUS AND METHOD

(71) Applicant: HYUNDAI MOBIS Co., Ltd., Seoul (KR)

(72) Inventors: Hyuk Lee, Yongin-si (KR); Soon Jong Jin, Yongin-si (KR); Byeong Hwan Jeon, Yongin-si (KR); Jun Han Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 78 days.

(21) Appl. No.: 17/009,698

(22) Filed: Sep. 1, 2020

(65) Prior Publication Data

US 2021/0094581 A1 Apr. 1, 2021

(30) Foreign Application Priority Data

Sep. 27, 2019 (KR) .................. 10-2019-0119635

(51) Int. Cl.
*B60W 40/04* (2006.01)
*B60W 60/00* (2020.01)

(52) U.S. Cl.
CPC ........ *B60W 60/0027* (2020.02); *B60W 40/04* (2013.01); *B60W 2552/00* (2020.02);
(Continued)

(58) Field of Classification Search
CPC ............. B60W 60/0027; B60W 40/04; B60W 2552/00; B60W 2554/4044; B60W 2556/65; B60W 2554/4045
(Continued)

(56) References Cited

U.S. PATENT DOCUMENTS 10,496,090 B2 * 12/2019 Latotzki .............. B60W 30/095
2016/0327400 A1 * 11/2016 Shikimachi .......... G09B 29/106
(Continued)

FOREIGN PATENT DOCUMENTS

JP         2012141139       * 7/2012
KR    10-1998-0068399         10/1998

OTHER PUBLICATIONS

Seongjin Choi, "Network-Wide Vehicle Trajectory Prediction in Urban Traffic Networks using Deep Learning", 2018, National Academy of Sciences: Transportation Research Board, vol. 2672(45) 173-184 (Year: 2018).*

(Continued)

*Primary Examiner* — Elaine Gort
*Assistant Examiner* — Matthias S Weisfeld
(74) *Attorney, Agent, or Firm* — H.C. Park & Associates, PLC

(57) ABSTRACT

Disclosed are an autonomous driving apparatus and method for an ego vehicle that autonomously travels. The autonomous driving apparatus includes a first sensor to detect a nearby vehicle nearby an ego vehicle, a memory to store map information, and a processor including a driving trajectory generator to generate a first driving trajectory of the ego vehicle and a second driving trajectory of the nearby vehicle based on the map information stored in the memory and a control processor configured to control autonomous driving of the ego vehicle based on the first and second driving trajectories generated by the driving trajectory generator.

2 Claims, 7 Drawing Sheets

(52) U.S. Cl.
CPC .............. *B60W 2554/4044* (2020.02); *B60W 2554/4045* (2020.02); *B60W 2556/65* (2020.02)

(58) Field of Classification Search
USPC .......................................................... 701/27
See application file for complete search history.

(56) References Cited

U.S. PATENT DOCUMENTS

| | | | |
|---|---|---|---|
| 2017/0350713 A1* | 12/2017 | Bhatia ................... | G05D 1/0274 |
| 2019/0220678 A1* | 7/2019 | Guo ........................ | G06V 20/58 |
| 2019/0236955 A1* | 8/2019 | Hu ......................... | G05D 1/0212 |
| 2020/0400440 A1* | 12/2020 | Stenneth .............. | G08G 1/0129 |

OTHER PUBLICATIONS

Brendan Tran Morris, "Trajectory Learning for Activity Understanding: Unsupervised, Multilevel, and Long-Term Adaptive Approach", Nov. 2011, IEEE Transactions on Pattern Analysis and Machine Intelligence, vol. 33, No. 11 (Year: 2011).*

Dragan Obradovic, "Fusion of Map and Sensor Data in a Modern Car Navigation System", Dec. 14, 2006, Journal of VLSI Signal Processing 45, 111-122, 2006 (Year: 2006).*

* cited by examiner

AUTONOMOUS DRIVING APPARATUS AND METHOD

CROSS-REFERENCE TO RELATED APPLICATION

This application claims priority from and the benefit of Korean Patent Application No. 10-2019-0119635, filed on Sep. 27, 2019, which is hereby incorporated by reference for all purposes as if set forth herein.

BACKGROUND

Field

Exemplary embodiments relate to an autonomous driving apparatus and method applied to an autonomous vehicle.

Discussion of the Background

Today's automobile industry is moving towards an implementation of autonomous driving to minimize the intervention of a driver in vehicle driving. An autonomous vehicle refers to a vehicle that autonomously determines a driving path by recognizing a nearby environment using an external information detection and processing function upon driving and independently travels using its own motive power.

The autonomous vehicle can autonomously travel up to a destination while preventing a collision against an obstacle on a driving path and controlling a vehicle speed and driving direction based on a shape of a road although a driver does not manipulate a steering wheel, an acceleration pedal or a brake. For example, the autonomous vehicle may perform acceleration in a straight road, and may perform deceleration while changing a driving direction in accordance with the curvature of a curved road in the curved road.

In order to guarantee the safe driving of an autonomous vehicle, the driving of the autonomous vehicle needs to be controlled based on a measured driving environment by precisely measuring the driving environment using sensors mounted on the vehicle and continuing to monitor the driving state of the vehicle. To this end, various sensors such as a LIDAR sensor, a radar sensor, an ultrasonic sensor and a camera sensor, that is, sensors for detecting nearby objects such as nearby vehicles, pedestrians and fixed facilities, are applied to the autonomous vehicle. Data output by such sensors are used to determine information on a driving environment, for example, state information such as a location, shape, moving direction and moving speed of a nearby object.

Furthermore, the autonomous vehicle also has a function for optimally determining a driving path and driving lane by determining and correcting the location of the vehicle based on previously stored map data, controlling the driving of the vehicle so that the vehicle does not deviate from the determined path and lane, and performing defense and evasion driving for a risk factor in a driving path or a vehicle that suddenly appears nearby.

Background of the Disclosure is disclosed in Korean Patent Application Laid-Open No. 10-1998-0068399 (Oct. 15, 1998).

The above information disclosed in this Background section is only for enhancement of understanding of the background of the invention and, therefore, it may contain information that does not constitute prior art.

SUMMARY

Exemplary embodiments of the present disclosure has been made in an effort to provide the provision of an autonomous driving apparatus and method for enabling autonomous driving control over an autonomous vehicle by generating a driving trajectory normally although an abnormality occurs in a function of a processor for generating a driving trajectory based on map information applied to the autonomous vehicle.

In an embodiment, an autonomous driving apparatus for an ego vehicle that autonomous travels, the autonomous driving apparatus includes: a first sensor to detect a vehicle nearby the ego vehicle, a memory to store map information, and a processor including a driving trajectory generator to generate a first driving trajectory of the ego vehicle and a second driving trajectory of the nearby vehicle based on the map information stored in the memory and a control processor to control autonomous driving of the ego vehicle based on the first and second driving trajectories generated by the driving trajectory generator. The control processor is configured to: determine whether a function of the driving trajectory generator is abnormal; request a target nearby vehicle around the ego vehicle to transmit new map information if it is determined that the function of the driving trajectory generator is abnormal; verify reliability of the new map information received from the target nearby vehicle, and control the autonomous driving of the ego vehicle based on the new map information and results of detection of the nearby object by the first sensor if the reliability of the new map information has been verified.

The control processor may be configured to determine that the function of the driving trajectory generator is abnormal when a data value of the first driving trajectory or the second driving trajectory generated by the driving trajectory generator is out of a preset reliability range.

The control processor may be configured to verify the reliability of the new map information based on the location of a reference object present in the new map information received from the target nearby vehicle.

The control processor may be configured to determine that the reliability of the new map information has been verified, when a difference between a first location value of the reference object present in the new map information received from the target nearby vehicle and a second location value of the reference object obtained as a result of detection of the reference object by a second sensor mounted on the target nearby vehicle is equal to or less than a preset reference value.

The control processor may be configured to generate the first driving trajectory of the ego vehicle and the second driving trajectory of the nearby vehicle by fusing the new map information and the results of the detection of the nearby object by the first sensor if the reliability of the new map information has been verified, and control the autonomous driving of the ego vehicle based on the first and second generated driving trajectories.

The nearby vehicle may include at least two surrounding vehicles.

In an embodiment, an autonomous driving method for an ego vehicle includes the steps of: controlling autonomous driving of the ego vehicle based on a first driving trajectory of the ego vehicle and a second trajectory of a nearby vehicle based on map information stored in a memory, wherein the first and second driving trajectories are generated by a driving trajectory generator; determining whether a function of the driving trajectory generator is abnormal; requesting a target nearby vehicle around the ego vehicle to transmit new map information if it is determined that the function of the driving trajectory generator is abnormal; verifying reliability of the new map information received from the target nearby vehicle, and controlling the autonomous driving of the ego vehicle based on the new map information and results of detection of the nearby object by a first sensor mounted on the ego vehicle if the reliability of the new map information has been verified.

The step of determining whether the driving trajectory generator is abnormal may include the step of determining that the function of the driving trajectory generator is abnormal when a data value of the first driving trajectory or the second driving trajectory is out of a preset reliability range.

The step of verifying the reliability may include the step of verifying the reliability of the new map information based on a location of a reference object present in the new map information received from the target nearby vehicle.

The step of in the verifying the reliability may include the step of determining that the reliability of the new map information has been verified, when a difference between a first location value of the reference object present in the new map information received from the target nearby vehicle and a second location value of the reference object obtained as a result of detection of the reference object by a second sensor mounted on the target nearby vehicle is equal to or less than a preset reference value.

The step of controlling the autonomous driving of the ego vehicle may include the steps of: generating the first driving trajectory of the ego vehicle and the second driving trajectory of the nearby vehicle by fusing the new map information and the results of the detection of the nearby object by the first sensor if the reliability of the new map information has been verified, and controlling the autonomous driving of the ego vehicle based on the generated first and second driving trajectories.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
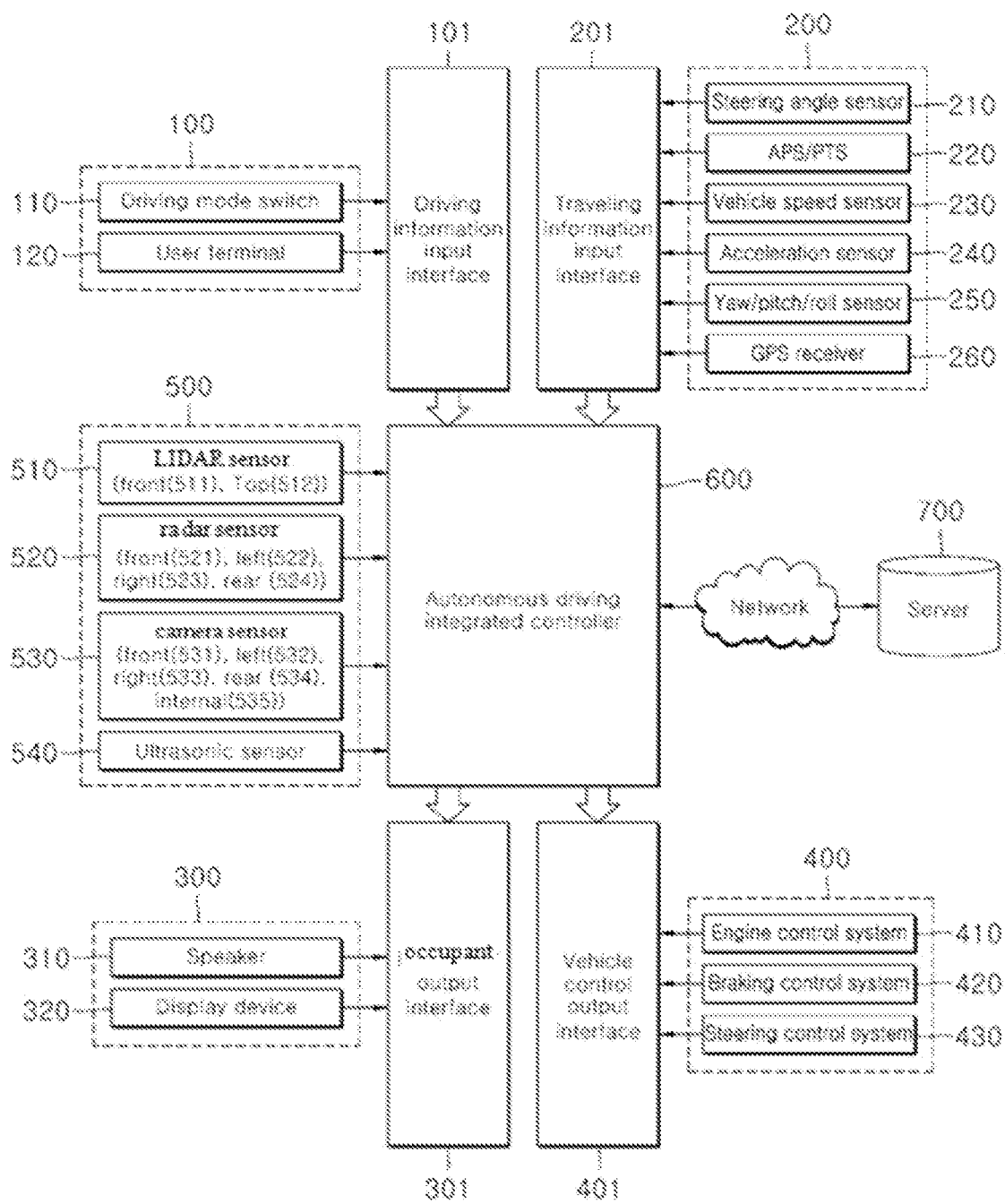
FIG. 1 is a general block diagram of an autonomous driving control system to which an autonomous driving apparatus according to an embodiment of the present disclosure may be applied.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, an autonomous driving apparatus and method will be described below with reference to the accompanying drawings through various exemplary embodiments. The thickness of lines or the size of elements shown in the drawings in this process may have been exaggerated for the clarity of a description and for convenience' sake. Terms to be described below have been defined by taking into consideration their functions in the disclosure, and may be changed depending on a user or operator's intention or practice. Accordingly, such terms should be interpreted based on the overall contents of this specification.

Figure 2:
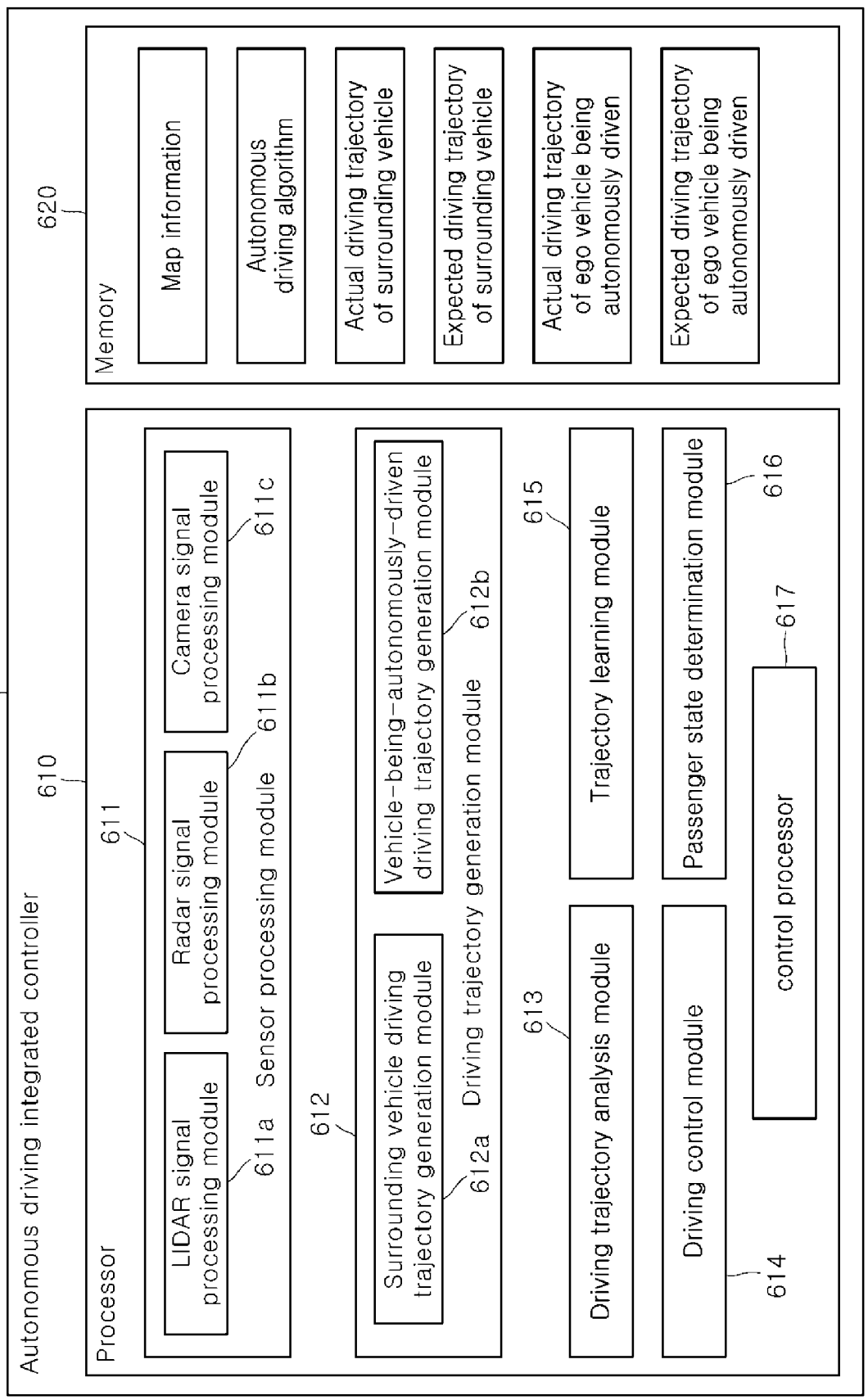
FIG. 2 is a block diagram illustrating a detailed configuration of an autonomous driving integrated controller in the autonomous driving apparatus according to an embodiment of the present disclosure.
Figure 3:
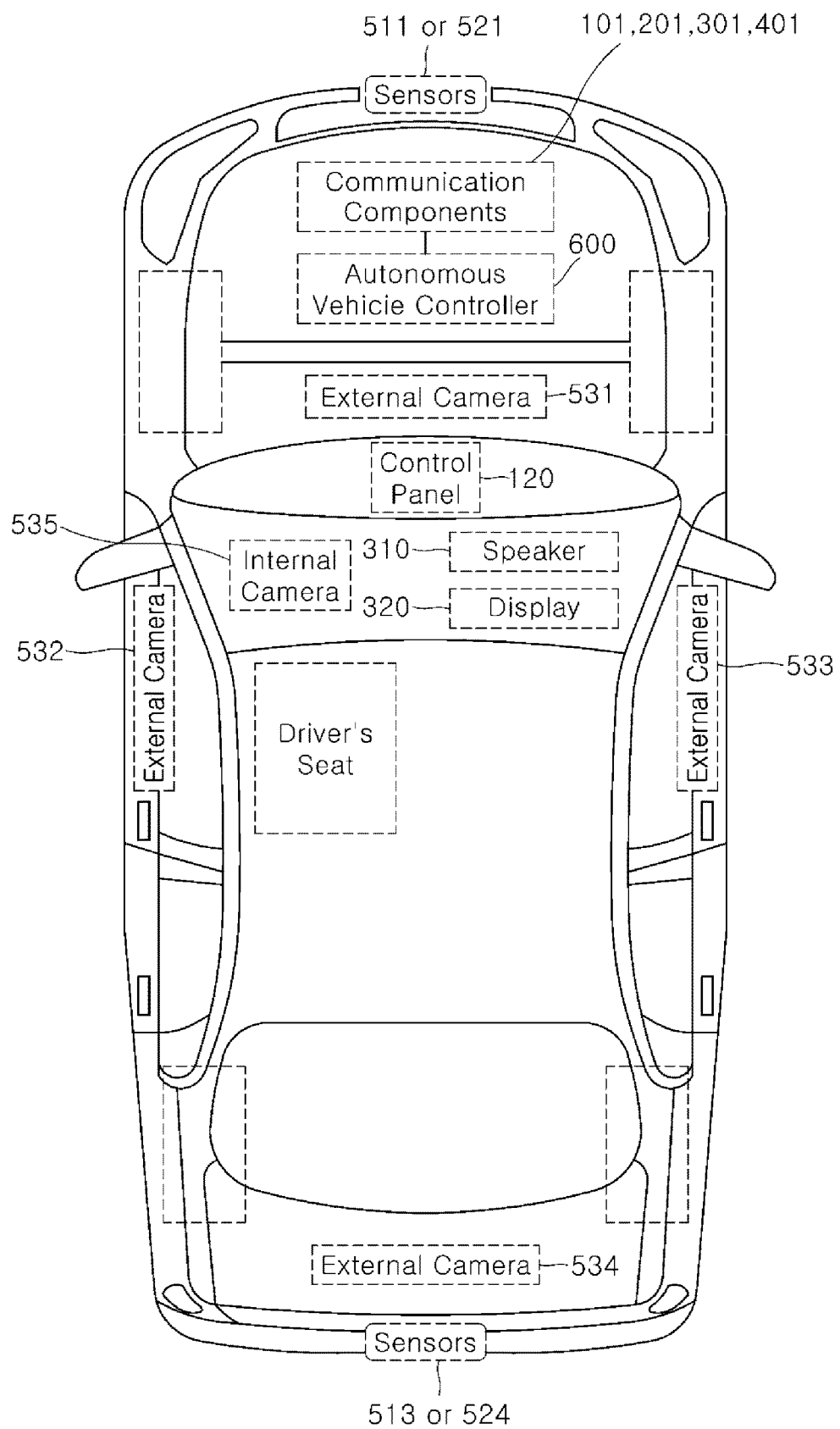
FIG. 3 is an exemplary diagram illustrating an example in which the autonomous driving apparatus according to an embodiment of the present disclosure is applied to a vehicle.
Figure 4:
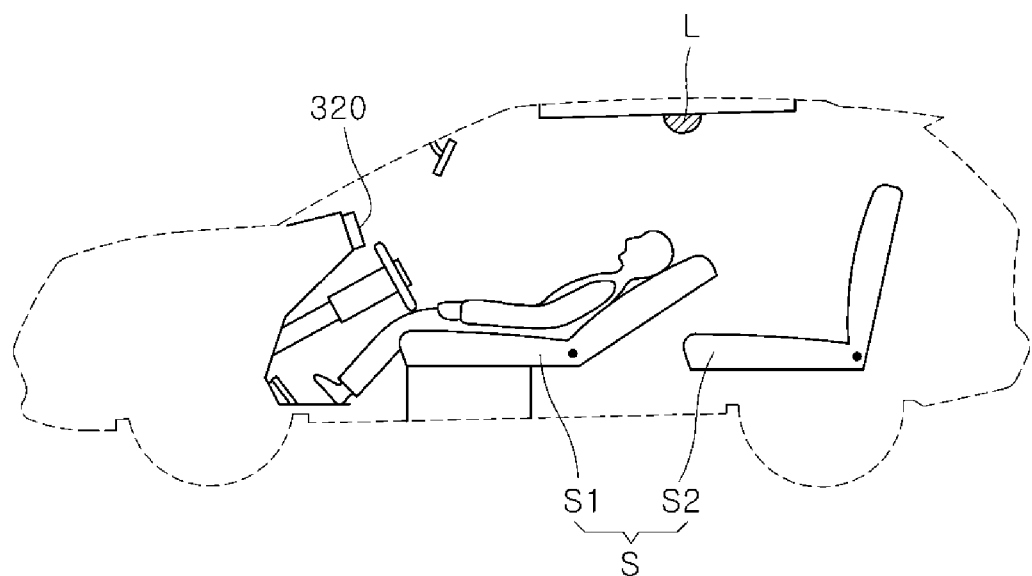
FIG. 4 is an exemplary diagram illustrating an example of an internal structure of a vehicle to which the autonomous driving apparatus according to an embodiment of the present disclosure is applied.
Figure 5:
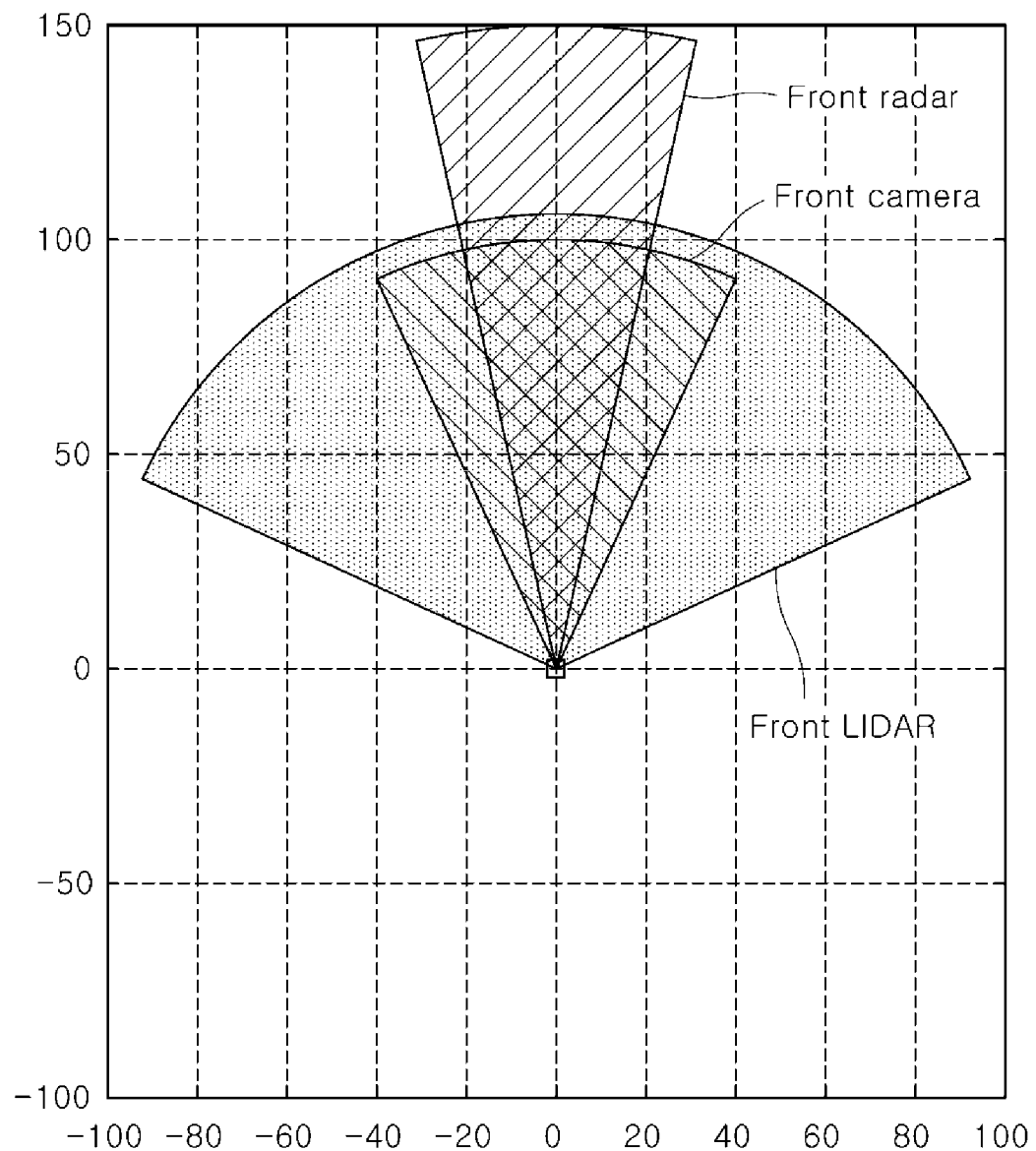
FIG. 5 is an exemplary diagram illustrating an example of a set distance and horizontal field of view within which a LIDAR sensor, a radar sensor and a camera sensor may detect a nearby object in the autonomous driving apparatus according to an embodiment of the present disclosure.
Figure 6:
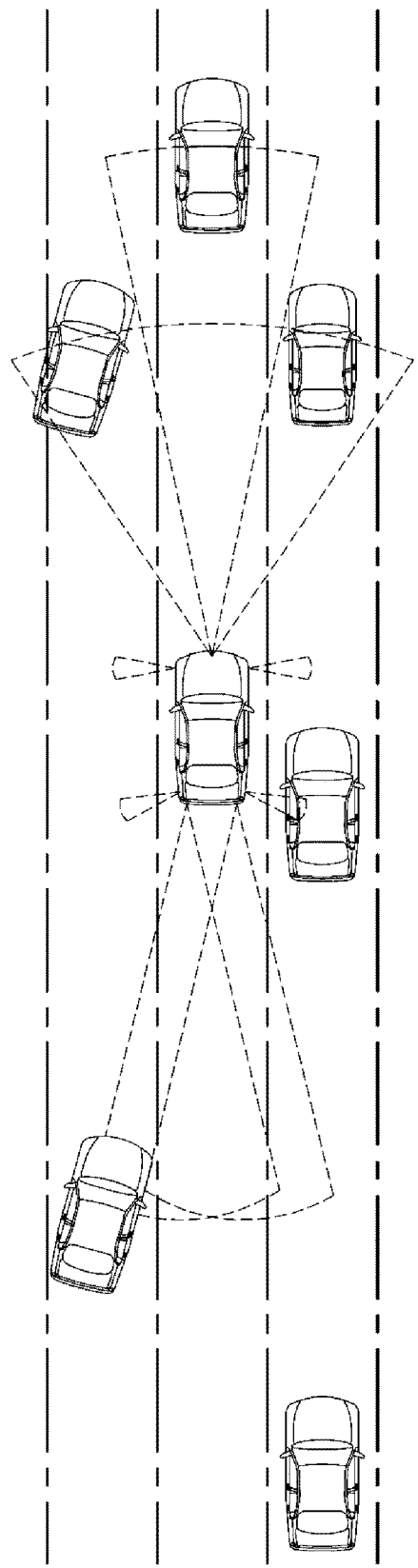
FIG. 6 is an exemplary diagram illustrating an example in which a sensor unit detects a nearby vehicle in the autonomous driving apparatus according to an embodiment of the present disclosure.

FIG. 1 is a general block diagram of an autonomous driving control system to which an autonomous driving apparatus according to an embodiment of the present disclosure may be applied. FIG. 2 is a block diagram illustrating a detailed configuration of an autonomous driving integrated controller in the autonomous driving apparatus according to an embodiment of the present disclosure. FIG. 3 is an exemplary diagram illustrating an example in which the autonomous driving apparatus according to an embodiment of the present disclosure is applied to a vehicle. FIG. 4 is an exemplary diagram illustrating an example of an internal structure of a vehicle to which the autonomous driving apparatus according to an embodiment of the present disclosure is applied. FIG. 5 is an exemplary diagram illustrating an example of a set distance and horizontal field of view within which a LIDAR sensor, a radar sensor and a camera sensor may detect a nearby object in the autonomous driving apparatus according to an embodiment of the present disclosure. FIG. 6 is an exemplary diagram illustrating an example in which a sensor unit detects a nearby vehicle in the autonomous driving apparatus according to an embodiment of the present disclosure.

First, the structure and functions of an autonomous driving control system to which an autonomous driving apparatus according to the present embodiment may be applied are described with reference to FIGS. 1 and 3. As illustrated in FIG. 1, the autonomous driving control system may be implemented based on an autonomous driving integrated controller 600 configured to transmit and receive data necessary for autonomous driving control of a vehicle through a driving information input interface 101, a traveling information input interface 201, an occupant output interface 301 and a vehicle control output interface 401.

The autonomous driving integrated controller 600 may obtain, through the driving information input interface 101, driving information based on a manipulation of an occupant for a user input unit 100 in an autonomous driving mode or manual driving mode of a vehicle. As illustrated in FIG. 1, the user input unit 100 may include a driving mode switch 110 and a user terminal 120 (e.g., a navigation terminal mounted on a vehicle or a smartphone or tablet PC owned by an occupant), for example. Accordingly, driving information may include driving mode information and navigation information of a vehicle. For example, a driving mode (i.e., an autonomous driving mode/manual driving mode or a sport mode/eco mode/safe mode/normal mode) of a vehicle determined by a manipulation of an occupant for the driving mode switch 110 may be transmitted to the autonomous driving integrated controller 600 through the driving information input interface 101 as the driving information. Furthermore, navigation information, such as the destination of an occupant and a path up to the destination (e.g., the shortest path or preference path, selected by the occupant, among candidate paths up to the destination) input by an occupant through the user terminal 120, may be transmitted to the autonomous driving integrated controller 600 through the driving information input interface 101 as the driving information. The user terminal 120 may be implemented as a control panel (e.g., touch screen panel) that provides a user interface (UI) through which a driver inputs or modifies information for autonomous driving control of a vehicle. In this case, the driving mode switch 110 may be implemented as a touch button on the user terminal 120.

Furthermore, the autonomous driving integrated controller 600 may obtain traveling information indicative of a driving state of a vehicle through the traveling information input interface 201. The traveling information may include a steering angle formed when an occupant manipulates a steering wheel, an acceleration pedal stroke or brake pedal stroke formed when an acceleration pedal or brake pedal is stepped on, and various types of information indicative of driving states and behaviors of a vehicle, such as a vehicle speed, acceleration, a yaw, a pitch and a roll, that is, behaviors formed in the vehicle. The pieces of traveling information may be detected by a traveling information detection unit 200, including a steering angle sensor 210, an acceleration position sensor (APS)/pedal travel sensor (PTS) 220, a vehicle speed sensor 230, an acceleration sensor 240, and a yaw/pitch/roll sensor 250, as illustrated in FIG. 1. Furthermore, the traveling information of a vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201, and may be used to control the driving of a vehicle in the autonomous driving mode or manual driving mode of the vehicle.

Furthermore, the autonomous driving integrated controller 600 may transmit, to an output unit 300, driving state information, provided to an occupant, through the occupant output interface 301 in the autonomous driving mode or manual driving mode of a vehicle. That is, the autonomous driving integrated controller 600 transmits driving state information of a vehicle to the output unit 300 so that an occupant can check the autonomous driving state or manual driving state of the vehicle based on the driving state information output through the output unit 300. The driving state information may include various types of information indicative of driving states of a vehicle, such as a current driving mode, transmission range and vehicle speed of the vehicle, for example. Furthermore, if it is determined that it is necessary to warn a driver in the autonomous driving mode or manual driving mode of a vehicle along with the driving state information, the autonomous driving integrated controller 600 transmits warning information to the output unit 300 through the occupant output interface 301 so that the output unit 300 can output a warning to the driver. In order to output such driving state information and warning information acoustically and visually, the output unit 300 may include a speaker 310 and a display 320 as illustrated in FIG. 1. In this case, the display 320 may be implemented as the same device as the user terminal 120 or may be implemented as an independent device separated from the user terminal 120.

Furthermore, the autonomous driving integrated controller 600 may transmit control information for driving control of a vehicle to a low-ranking control system 400, applied to a vehicle, through the vehicle control output interface 401 in the autonomous driving mode or manual driving mode of the vehicle. As illustrated in FIG. 1, the low-ranking control system 400 for driving control of a vehicle may include an engine control system 410, a braking control system 420 and a steering control system 430. The autonomous driving integrated controller 600 may transmit engine control information, braking control information and steering control information, as the control information, to the respective low-ranking control systems 410, 420 and 430 through the vehicle control output interface 401. Accordingly, the engine control system 410 may control the vehicle speed and acceleration of a vehicle by increasing or decreasing fuel supplied to an engine. The braking control system 420 may control the braking of the vehicle by controlling braking power of the vehicle. The steering control system 430 may control the steering of the vehicle through a steering apparatus (e.g., motor driven power steering (MDPS) system) applied to the vehicle.

As described above, the autonomous driving integrated controller 600 according to the present embodiment may obtain driving information based on a manipulation of a driver and traveling information indicative of a driving state of a vehicle through the driving information input interface 101 and the traveling information input interface 201, respectively, may transmit, to the output unit 300, driving state information and warning information, generated based on an autonomous driving algorithm processed by a processor 610 therein, through the occupant output interface 301, and may transmit, to the low-ranking control system 400, control information, generated based on the autonomous driving algorithm processed by the processor 610, through the vehicle control output interface 401 so that driving control of the vehicle is performed.

In order to guarantee stable autonomous driving of a vehicle, it is necessary to continuously monitor a driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of a vehicle, such as a nearby vehicle, pedestrian, road or fixed facility (e.g., a signal light, a signpost, a traffic sign or a construction fence). As used herein, multiple nearby objects may be "surrounding objects" if they surround all or part of the outer periphery of an ego vehicle, such as shown in FIG. 6. A vehicle being autonomously controlled is known in the art as an "ego" vehicle. The sensor unit 500 may include one or more of a LIDAR sensor 510, a radar sensor 520 and a camera sensor 530 in order to detect a nearby object outside a vehicle, as illustrated in FIG. 1.

The LIDAR sensor 510 may transmit a laser signal to the periphery of a vehicle, and may detect a nearby object outside the vehicle by receiving a signal reflected and returned from a corresponding object. The LIDAR sensor 510 may detect a nearby object located within the ranges of a set distance, set vertical field of view and set horizontal field of view, which are predefined depending on its specifications. The LIDAR sensor 510 may include a front LIDAR sensor 511, a top LIDAR sensor 512 and a rear LIDAR sensor 513 installed at the front, top and rear of a vehicle, respectively, but the installation location of each sensor and the number of sensors installed are not limited to a specific embodiment. A threshold for determining the validity of a laser signal reflected and returned from a corresponding object may be previously stored in a memory 620 of the autonomous driving integrated controller 600. The processor 610 of the autonomous driving integrated controller 600 may determine a location (including a distance to a corresponding object), speed and moving direction of the corresponding object using a method of measuring the time taken for a laser signal, transmitted through the LIDAR sensor 510, to be reflected and returned from the corresponding object.

The radar sensor 520 may radiate electromagnetic waves around a vehicle, and may detect a nearby object outside the vehicle by receiving a signal reflected and returned from a corresponding object. The radar sensor 520 may detect a nearby object within the ranges of a set distance, set vertical field of view and set horizontal field of view, which are predefined depending on its specifications. The radar sensor 520 may include a front radar sensor 521, a left radar sensor 522, a right radar sensor 523 and a rear radar sensor 524 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object using a method of analyzing power of electromagnetic waves transmitted and received through the radar sensor 520.

The camera sensor 530 may detect a nearby object outside a vehicle by photographing the periphery of the vehicle, and may detect a nearby object within the ranges of a set distance, set vertical field of view and set horizontal field of view, which are predefined depending on its specifications. The camera sensor 530 may include a front camera sensor 531, a left camera sensor 532, a right camera sensor 533 and a rear camera sensor 534 installed at the front, left, right and rear of a vehicle, respectively, but the installation location of each sensor and the number of sensors installed are not limited to a specific embodiment. The processor 610 of the autonomous driving integrated controller 600 may determine a location (including a distance to a corresponding object), speed and moving direction of the corresponding object by applying predefined image processing to an image captured by the camera sensor 530. Furthermore, an internal camera sensor 535 for photographing the inside of a vehicle may be mounted at a given location (e.g., rear view mirror) within the vehicle. The processor 610 of the autonomous driving integrated controller 600 may monitor a behavior and state of an occupant based on an image captured by the internal camera sensor 535, and may output guidance or a warning to the occupant through the output unit 300.

As illustrated in FIG. 1, the sensor unit 500 may further include an ultrasonic sensor 540 in addition to the LIDAR sensor 510, the radar sensor 520 and the camera sensor 530, and may further adopt various types of sensors for detecting a nearby object of a vehicle along with the sensors. FIG. 3 illustrates an example in which in order to help understanding of the present embodiment, the front LIDAR sensor 511 or the front radar sensor 521 is installed at the front of a vehicle, the rear LIDAR sensor 513 or the rear radar sensor 524 is installed at the rear of the vehicle, and the front camera sensor 531, the left camera sensor 532, the right camera sensor 533 and the rear camera sensor 534 are installed at the front, left, right and rear of the vehicle, respectively. However, as described above, the installation location of each sensor and the number of sensors installed are not limited to a specific embodiment. FIG. 5 illustrates an example of a set distance and horizontal field of view within which the LIDAR sensor 510, the radar sensor 520 and the camera sensor 530 may detect a nearby object ahead of the vehicle. FIG. 6 illustrates an example in which each sensor detects a nearby object. FIG. 6 is merely an example of the detection of a nearby object. A method of detecting a nearby object is determined by the installation location of each sensor and the number of sensors installed. A nearby vehicle and a nearby object in the omni-directional area of an ego vehicle may be detected depending on the configuration of the sensor unit 500.

Furthermore, in order to determine a state of an occupant within a vehicle, the sensor unit 500 may further include a microphone and bio sensor for detecting a voice and bio signal (e.g., heart rate, electrocardiogram, respiration, blood pressure, body temperature, electroencephalogram, photoplethysmography (or pulse wave) and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor and a blood sugar sensor.

FIG. 4 illustrates an example of an internal structure of a vehicle. An internal device whose state is controlled by a manipulation of an occupant, such as a driver or fellow passenger of a vehicle, and which supports driving or convenience (e.g., rest or entertainment activities) of the occupant may be installed within the vehicle. Such an internal device may include a vehicle seat S in which an occupant is seated, a lighting device L such as an internal light and a mood lamp, the user terminal 120, the display 320, and an internal table. The state of the internal device may be controlled by the processor 610.

The angle of the vehicle seat S may be adjusted by the processor 610 (or by a manual manipulation of an occupant). If the vehicle seat S is configured with a front row seat S1 and a back row seat S2, only the angle of the front row seat S1 may be adjusted. If the back row seat S2 is not provided and the front row seat S1 is divided into a seat structure and a footstool structure, the front row seat S1 may be implemented so that the seat structure of the front row seat S1 is physically separated from the footstool structure and the angle of the front row seat S1 is adjusted. Furthermore, an actuator (e.g., motor) for adjusting the angle of the vehicle seat S may be provided. The on and off of the lighting device L may be controlled by the processor 610 (or by a manual manipulation of an occupant). If the lighting device L includes a plurality of lighting units such as an internal light and a mood lamp, the on and off of each of the lighting units may be independently controlled. The angle of the user terminal 120 or the display 320 may be adjusted by the processor 610 (or by a manual manipulation of an occupant) based on an angle of field of an occupant. For example, the angle of the user terminal 120 or the display 320 may be adjusted so that a screen thereof is placed in an occupant's gaze direction. In this case, an actuator (e.g., motor) for adjusting the angle of the user terminal 120 and the display 320 may be provided.

As illustrated in FIG. 1, the autonomous driving integrated controller 600 may communicate with a server 700 over a network. Various communication methods, such as a wide area network (WAN), a local area network (LAN) or a personal area network (PAN), may be adopted as a network method between the autonomous driving integrated controller 600 and the server 700. Furthermore, in order to secure wide network coverage, a low power wide area network (LPWAN, including commercialized technologies such as LoRa, Sigfox, Ingenu, LTE-M and NB-IOT, that is, networks having very wide coverage, among the IoT) communication method may be adopted. For example, a LoRa (capable of low power communication and also having wide coverage of a maximum of about 20 Km) or Sigfox (having coverage of 10 Km (downtown) to 30 Km (in the outskirt area outside the downtown area) according to environments) communication method may be adopted. Furthermore, LTE network technologies based on $3^{rd}$ generation partnership project (3GPP) Release 12, 13, such as machine-type communications (LTE-MTC) (or LTE-M), narrowband (NB) LTE-M, and NB IoT having a power saving mode (PSM), may be adopted. The server 700 may provide the latest map information (may correspond to various types of map information, such as two-dimensional (2-D) navigation map data, three-dimensional (3-D) manifold map data or 3-D high-precision electronic map data). Furthermore, the server 700 may provide various types of information, such as accident information, road control information, traffic volume information and weather information in a road. The autonomous driving integrated controller 600 may update map information, stored in the memory 620, by receiving the latest map information from the server 700, may receive accident information, road control information, traffic volume information and weather information, and may use the information for autonomous driving control of a vehicle.

The structure and functions of the autonomous driving integrated controller 600 according to the present embodiment are described with reference to FIG. 2. As illustrated in FIG. 2, the autonomous driving integrated controller 600 may include the processor 610 and the memory 620.

The memory 620 may store basic information necessary for autonomous driving control of a vehicle or may store information generated in an autonomous driving process of a vehicle controlled by the processor 610. The processor 610 may access (or read) information stored in the memory 620, and may control autonomous driving of a vehicle. The memory 620 may be implemented as a computer-readable recording medium, and may operate in such a way to be accessed by the processor 610. Specifically, the memory 620 may be implemented as a hard drive, a magnetic tape, a memory card, a read-only memory (ROM), a random access memory (RAM), a digital video disc (DVD) or an optical data storage, such as an optical disk.

The memory 620 may store map information that is required for autonomous driving control by the processor 610. The map information stored in the memory 620 may be a navigation map (or a digital map) that provides information on a road basis, but may be implemented as a precise road map that provides road information on a lane basis, that is, 3-D high-precision electronic map data, in order to improve the precision of autonomous driving control. Accordingly, the map information stored in the memory 620 may provide dynamic and static information necessary for autonomous driving control over a vehicle, such as a lane, the center line of a lane, a regulation lane, a road boundary, the center line of a road, a traffic sign, a road mark, the shape and height of a road, and a lane width.

Furthermore, the memory 620 may store the autonomous driving algorithm for autonomous driving control of a vehicle. The autonomous driving algorithm is an algorithm (recognition, determination and control algorithm) for recognizing the periphery of an autonomous vehicle, determining the state of the periphery thereof, and controlling the driving of the vehicle based on a result of the determination. The processor 610 may perform active autonomous driving control for a nearby environment of a vehicle by executing the autonomous driving algorithm stored in the memory 620.

The processor 610 may control autonomous driving of a vehicle based on the driving information and the traveling information received from the driving information input interface 101 and the traveling information input interface 201, respectively, the information on a nearby object detected by the sensor unit 500, and the map information and the autonomous driving algorithm stored in the memory 620. The processor 610 may be implemented as an embedded processor, such as a complex instruction set computer (CICS) or a reduced instruction set computer (RISC), or a dedicated semiconductor circuit, such as an application-specific integrated circuit (ASIC).

In the present embodiment, the processor 610 may control autonomous driving of an ego vehicle by analyzing the driving trajectory of the ego vehicle and the driving trajectory of a nearby vehicle. To this end, as illustrated in FIG. 2, the processor 610 may include a sensor processing module 611, a driving trajectory generation module 612, a driving trajectory analysis module 613, a driving control module 614, a trajectory learning module 615 and an occupant state determination module 616. Furthermore, the processor 610 may include a control processor 617 for associating and controlling operations of the modules. FIG. 2 illustrates each of the modules as an independent block based on its function, but the modules may be integrated into a single module and implemented as an element for integrating and performing the functions of the modules.

The sensor processing module 611 may determine traveling information of a nearby vehicle (i.e., includes the location of the nearby vehicle, and may further include the speed and moving direction of the nearby vehicle along with the location) based on a result of detecting, by the sensor unit 500, the nearby vehicle around an ego vehicle. That is, the sensor processing module 611 may determine the location of a nearby vehicle based on a signal received through the LIDAR sensor 510, may determine the location of a nearby vehicle based on a signal received through the radar sensor 520, may determine the location of a nearby vehicle based on an image captured by the camera sensor 530, and may determine the location of a nearby vehicle based on a signal received through the ultrasonic sensor 540. To this end, as illustrated in FIG. 1, the sensor processing module 611 may include a LIDAR signal processing module 611$a$, a radar signal processing module 611$b$ and a camera signal processing module 611$c$. In some embodiments, an ultrasonic signal processing module (not illustrated) may be further added to the sensor processing module 611. An implementation method of the method of determining the location of a nearby vehicle using the LIDAR sensor 510, the radar sensor 520 and the camera sensor 530 is not limited to a specific embodiment. Furthermore, the sensor processing module 611 may determine attribute information, such as the size and type of a nearby vehicle, in addition to the location, speed and moving direction of the nearby vehicle. An algorithm for determining the information, such as the location, speed, moving direction, size and type of a nearby vehicle, may be predefined.

The driving trajectory generation module 612 may generate an actual driving trajectory and expected driving trajectory of a nearby vehicle and an actual driving trajectory of an ego vehicle. To this end, as illustrated in FIG. 2, the driving trajectory generation module 612 may include a nearby vehicle driving trajectory generation module 612a and an ego vehicle driving trajectory generation module 612b.

First, the nearby vehicle driving trajectory generation module 612a may generate an actual driving trajectory of a nearby vehicle.

Specifically, the nearby vehicle driving trajectory generation module 612a may generate an actual driving trajectory of a nearby vehicle based on traveling information of the nearby vehicle detected by the sensor unit 500 (i.e., the location of the nearby vehicle determined by the sensor processing module 611). In this case, in order to generate the actual driving trajectory of the nearby vehicle, the nearby vehicle driving trajectory generation module 612a may refer to map information stored in the memory 620, and may generate the actual driving trajectory of the nearby vehicle by making cross reference to the location of the nearby vehicle detected by the sensor unit 500 and a given location in the map information stored in the memory 620. For example, when a nearby vehicle is detected at a specific point by the sensor unit 500, the nearby vehicle driving trajectory generation module 612a may specify a currently detected location of the nearby vehicle in map information stored in the memory 620 by making cross reference to the detected location of the nearby vehicle and a given location in the map information. The nearby vehicle driving trajectory generation module 612a may generate an actual driving trajectory of a nearby vehicle by continuously monitoring the location of the nearby vehicle as described above. That is, the nearby vehicle driving trajectory generation module 612a may generate an actual driving trajectory of a nearby vehicle by mapping the location of the nearby vehicle, detected by the sensor unit 500, to a location in map information, stored in the memory 620, based on the cross reference and accumulating the location.

An actual driving trajectory of a nearby vehicle may be compared with an expected driving trajectory of the nearby vehicle to be described later to be used to determine whether map information stored in the memory 620 is accurate. In this case, if an actual driving trajectory of a specific nearby vehicle is compared with an expected driving trajectory thereof, there may be a problem in that it is erroneously determined that map information stored in the memory 620 is inaccurate although the map information is accurate. For example, if actual driving trajectories and expected driving trajectories of multiple nearby vehicles are the same and an actual driving trajectory and expected driving trajectory of a specific nearby vehicle are different, when only the actual driving trajectory of the specific nearby vehicle is compared with the expected driving trajectory thereof, it may be erroneously determined that map information stored in the memory 620 is inaccurate although the map information is accurate. In order to prevent this problem, it is necessary to determine whether the tendency of actual driving trajectories of a plurality of nearby vehicles gets out of an expected driving trajectory. To this end, the nearby vehicle driving trajectory generation module 612a may generate the actual driving trajectory of each of the plurality of nearby vehicles. Furthermore, if it is considered that a driver of a nearby vehicle tends to slightly move a steering wheel left and right during his or her driving process for the purpose of straight-line path driving, an actual driving trajectory of the nearby vehicle may be generated in a curved form, not a straight-line form. In order to compute an error between expected driving trajectories to be described later, the nearby vehicle driving trajectory generation module 612a may generate an actual driving trajectory in a straight-line form by applying a given smoothing scheme to the original actual driving trajectory generated in a curved form. Various schemes, such as interpolation for each location of a nearby vehicle, may be adopted as the smoothing scheme.

Furthermore, the nearby vehicle driving trajectory generation module 612a may generate an expected driving trajectory of a nearby vehicle based on map information stored in the memory 620.

As described above, the map information stored in the memory 620 may be 3-D high-precision electronic map data. Accordingly, the map information may provide dynamic and static information necessary for autonomous driving control of a vehicle, such as a lane, the center line of a lane, a regulation lane, a road boundary, the center line of a road, a traffic sign, a road mark, a shape and height of a road, and a lane width. If it is considered that a vehicle commonly travels in the middle of a road, it may be expected that a nearby vehicle that travels around an ego vehicle will also travel in the middle of a road. Accordingly, the nearby vehicle driving trajectory generation module 612a may generate an expected driving trajectory of the nearby vehicle as the center line of a lane incorporated into map information.

The ego vehicle driving trajectory generation module 612b may generate an actual driving trajectory of an ego vehicle that has been driven so far based on the traveling information of the ego vehicle obtained through the traveling information input interface 201.

Specifically, the ego vehicle driving trajectory generation module 612b may generate an actual driving trajectory of an ego vehicle by making cross reference to a location of the ego vehicle obtained through the traveling information input interface 201 (i.e., information on the location of the ego vehicle obtained by the GPS receiver 260) and a given location in map information stored in the memory 620. For example, the ego vehicle driving trajectory generation module 612b may specify a current location of an ego vehicle, in map information, stored in the memory 620, by making cross reference to a location of the ego vehicle, obtained through the traveling information input interface 201, and a given location in the map information. As described above, the ego vehicle driving trajectory generation module 612b may generate an actual driving trajectory of the ego vehicle by continuously monitoring the location of the ego vehicle. That is, the ego vehicle driving trajectory generation module 612b may generate the actual driving trajectory of the ego vehicle by mapping the location of the ego vehicle, obtained through the traveling information input interface 201, to a location in the map information stored in the memory 620, based on the cross reference and accumulating the location.

Furthermore, the ego vehicle driving trajectory generation module 612b may generate an expected driving trajectory up to the destination of an ego vehicle based on map information stored in the memory 620.

That is, the ego vehicle driving trajectory generation module 612b may generate the expected driving trajectory up to the destination based on a current location of the ego vehicle obtained through the traveling information input interface 201 (i.e., information on the current location of the ego vehicle obtained through the GPS receiver 260) and the map information stored in the memory 620. Like the expected driving trajectory of the nearby vehicle, the expected driving trajectory of the ego vehicle may be generated as the center line of a lane incorporated into the map information stored in the memory 620.

The driving trajectories generated by the nearby vehicle driving trajectory generation module 612a and the ego vehicle driving trajectory generation module 612b may be stored in the memory 620, and may be used for various purposes in a process of controlling, by the processor 610, autonomous driving of the ego vehicle. In this case, the accuracy of a driving trajectory generated by the driving trajectory generation module 612 is directly related to the accuracy of autonomous driving control. Accordingly, as will be described later, if it is determined that an abnormality has occurred in a function of the driving trajectory generation module 612, the control processor 617 may stop an operation of the driving trajectory generation module 612, may generate a driving trajectory based on new map information received from a target nearby vehicle, and may control autonomous driving of an ego vehicle. This will be described in detail later.

The driving trajectory analysis module 613 may diagnose current reliability of autonomous driving control over an ego vehicle by analyzing driving trajectories (i.e., an actual driving trajectory and expected driving trajectory of a nearby vehicle and an actual driving trajectory of the ego vehicle) that are generated by the driving trajectory generation module 612 and stored in the memory 620. The diagnosis of the reliability of autonomous driving control may be performed in a process of analyzing a trajectory error between the actual driving trajectory and expected driving trajectory of the nearby vehicle.

The driving control module 614 may perform a function for controlling autonomous driving of an ego vehicle. Specifically, the driving control module 614 may process the autonomous driving algorithm synthetically based on the driving information and the traveling information received through the driving information input interface 101 and the traveling information input interface 201, respectively, the information on a nearby object detected by the sensor unit 500, and the map information stored in the memory 620, may transmit the control information to the low-ranking control system 400 through the vehicle control output interface 401 so that the low-ranking control system 400 controls autonomous driving of an ego vehicle, and may transmit the driving state information and warning information of the ego vehicle to the output unit 300 through the occupant output interface 301 so that a driver can recognize the driving state information and warning information. Furthermore, when controlling such autonomous driving in an integrated manner, the driving control module 614 controls the autonomous driving by taking into consideration the driving trajectories of an ego vehicle and a nearby vehicle, which have been analyzed by the sensor processing module 611, the driving trajectory generation module 612 and the driving trajectory analysis module 613, thereby improving the precision of autonomous driving control and enhancing the safety of autonomous driving control.

The trajectory learning module 615 may perform learning or corrections on an actual driving trajectory of an ego vehicle generated by the ego vehicle driving trajectory generation module 612b. For example, when a trajectory error between an actual driving trajectory and expected driving trajectory of a nearby vehicle is a preset threshold or more, the trajectory learning module 615 may determine that an actual driving trajectory of an ego vehicle needs to be corrected by determining that map information stored in the memory 620 is inaccurate. Accordingly, the trajectory learning module 615 may determine a lateral shift value for correcting the actual driving trajectory of the ego vehicle, and may correct the driving trajectory of the ego vehicle.

The occupant state determination module 616 may determine a state and behavior of an occupant based on a state and bio signal of the occupant detected by the internal camera sensor 535 and the bio sensor. The state of the occupant determined by the occupant state determination module 616 may be used for autonomous driving control over an ego vehicle or in a process of outputting a warning to the occupant.

Hereinafter, an embodiment in which when an abnormality occurs in a function of the driving trajectory generation module of an ego vehicle, new map information applied to a nearby autonomous vehicle is received and autonomous driving of the ego vehicle is controlled is described based on the aforementioned contents.

As described above, the driving trajectory generation module 612 according to the present embodiment operates to generate a driving trajectory (e.g., an actual driving trajectory or expected driving trajectory) of an ego vehicle and a driving trajectory (e.g., an actual driving trajectory or expected driving trajectory) of a nearby vehicle based on map information stored in the memory. The control processor 617 may control autonomous driving of the ego vehicle based on the driving trajectories generated by the driving trajectory generation module 612. For example, in a process of moving, by an ego vehicle, up to a destination along an expected driving trajectory of the ego vehicle, the control processor 617 may perform reliability diagnosis of autonomous driving control by analyzing a trajectory error between an actual driving trajectory and expected driving trajectory of a nearby vehicle through the driving trajectory analysis module 613, and may perform corrections on an actual driving trajectory of the ego vehicle through the trajectory learning module 615. Such an operation of the control processor 617 is based on the premise of a normal operation of the driving trajectory generation module 612, and thus requires safe logic which may be applied when an abnormality occurs in a function of the driving trajectory generation module 612 for normal autonomous driving control by the control processor 617.

To this end, first, the control processor 617 may determine whether a function of the driving trajectory generation module 612 is abnormal. In this case, the control processor 617 may determine that the function of the driving trajectory generation module 612 is abnormal when a data value of the driving trajectory generated by the driving trajectory generation module 612 is out of a preset reliability range. The reliability range may be previously set in the control processor 617 by taking into consideration the range of the data value of the driving trajectory generated by the driving trajectory generation module 612 in a state where the function of the driving trajectory generation module 612 is normal.

If it is determined that the function of the driving trajectory generation module 612 is abnormal, the control processor 617 may request a target nearby vehicle around the ego vehicle to transmit new map information. In the present embodiment, the term "target nearby vehicle" is used to describe a nearby vehicle to which new map information used to generate a driving trajectory when a function of the driving trajectory generation module 612 of an ego vehicle is abnormal has been applied. However, the target nearby vehicle may refer to the same vehicle as the aforementioned nearby vehicle whose actual driving trajectory and expected driving trajectory are calculated by the driving trajectory generation module 612. The new map information applied to the target nearby vehicle may be three-dimensional (3-D) high-precision electronic map data or 3-D lattice map or may be map information into which road data obtained by the target nearby vehicle while traveling on a road or road data received by the target nearby vehicle from another vehicle have been incorporated. The target nearby vehicle to which such new map information has been applied may correspond to an autonomous vehicle like the ego vehicle.

If the target nearby vehicle approves the request of the ego vehicle for the new map information (i.e., an occupant who gets in the target nearby vehicle approves the request), the control processor 617 may receive the new map information from the target nearby vehicle using a vehicle to vehicle (V2V) communication method. The control processor 617 may verify the reliability of the new map information before using the new map information for autonomous driving control over the ego vehicle. In this case, the control processor 617 may verify the reliability of the new map information based on the location of a reference object present in the new map information received from the target nearby vehicle. The reference object may mean a fixed facility (e.g., a signal light, a crosswalk, or other road surface infrastructure) present in the new map information.

Accordingly, the control processor 617 may determine that the reliability of the new map information has been verified when a difference between a first location value of the reference object present in the new map information received from the target nearby vehicle and a second location value of the reference object obtained as a result of the detection of the reference object by a sensor mounted on the target nearby vehicle is a preset reference value or less. That is, the control processor 617 may receive, from the target nearby vehicle, the first location value of the reference object present in the new map information (i.e., a coordinate value of the reference object present in the new map information), may receive, from the target nearby vehicle, the second location value of the reference object detected by the sensor mounted on the target nearby vehicle (i.e., a coordinate value of the reference object obtained by the sensor), and may determine that the reliability of the new map information has been verified when a difference between the first and second location values is the reference value or less. The second location value of the reference object detected by the sensor mounted on the target nearby vehicle functions as a criterion for verifying the reliability of the new map information. The reference value may be variously selected depending on a designer's intention and the specifications of a vehicle system and previously set in the control processor 617.

If it is determined that the reliability of the new map information has been verified, the control processor 617 may control autonomous driving of the ego vehicle based on the new map information and the results of the detection of a nearby object by the sensor unit. Specifically, the control processor 617 may generate a driving trajectory of the ego vehicle and a driving trajectory of the target nearby vehicle by fusing the new map information and the results of the detection of the nearby object by the sensor unit, and then may control autonomous driving of the ego vehicle based on the generated driving trajectories.

That is, if the reliability of the new map information is verified, the control processor 617 may autonomously generate a driving trajectory of the ego vehicle and a driving trajectory of the target nearby vehicle based on the new map information without the intervention of the driving trajectory generation module 612. In this case, the control processor 617 may generate the driving trajectory of the ego vehicle and the driving trajectory of the target nearby vehicle by fusing the new map information and the results of the detection of the nearby object by the sensor unit, and may control autonomous driving of the ego vehicle.

Figure 7:
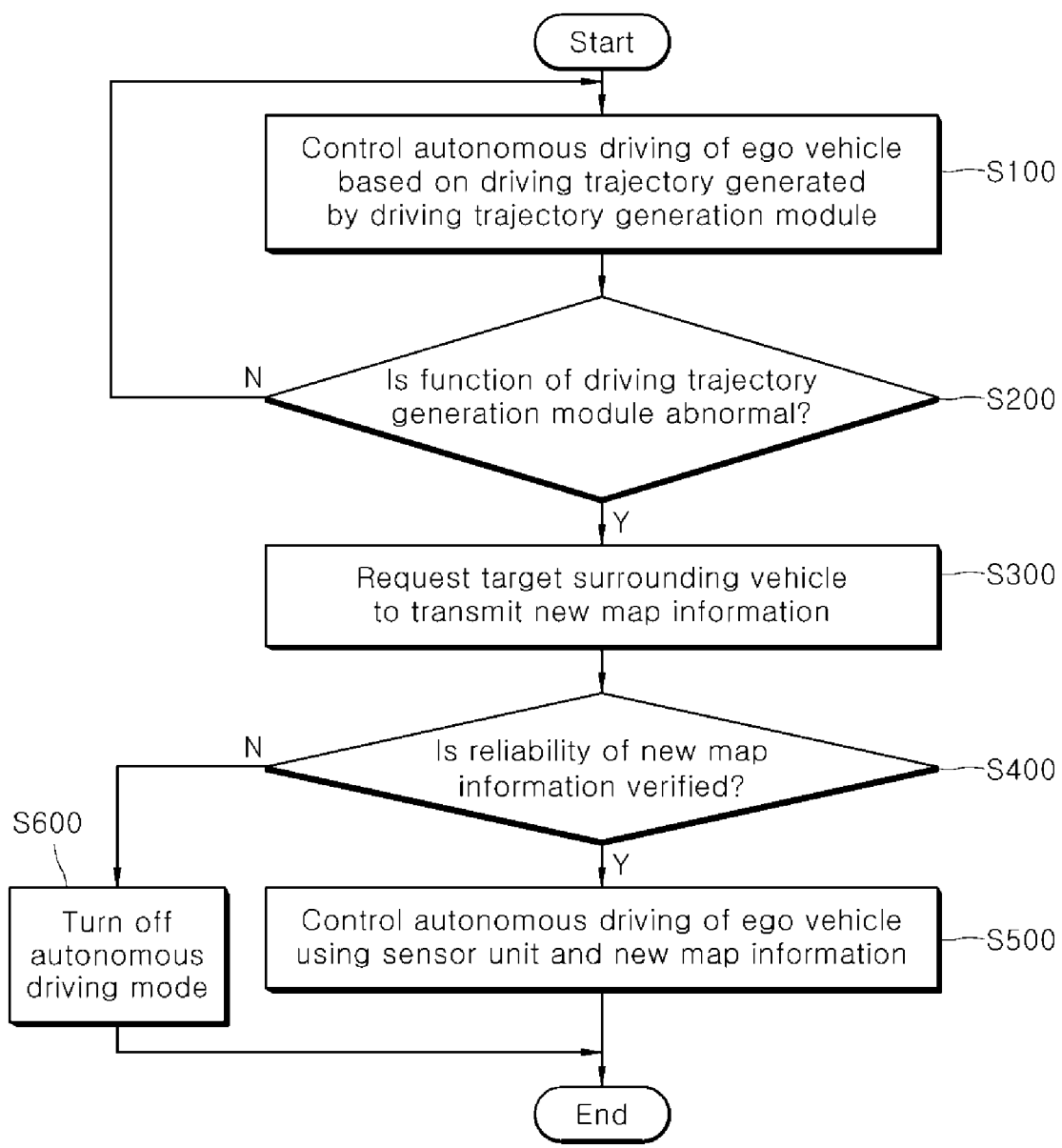
FIG. 7 is a flowchart for describing an autonomous driving method according to an embodiment of the present disclosure.

FIG. 7 is a flowchart for describing an autonomous driving method according to an embodiment of the present disclosure.

The autonomous driving method according to an embodiment of the present disclosure is described with reference to FIG. 7. First, the control processor 617 controls autonomous driving of an ego vehicle based on a driving trajectory generated by the driving trajectory generation module 612 (S100).

Next, the control processor 617 determines whether a function of the driving trajectory generation module 612 is abnormal (S200). At step S200, the control processor 617 determines that the function of the driving trajectory generation module 612 is abnormal when a data value of the driving trajectory generated by the driving trajectory generation module 612 is out of a preset reliability range.

If, as a result of the determination at step S200, the function of the driving trajectory generation module 612 is abnormal, the control processor 617 requests a target nearby vehicle around the ego vehicle to transmit new map information (S300).

Next, the control processor 617 verifies the reliability of the new map information received from the target nearby vehicle (S400). At step S400, the control processor 617 verifies the reliability of the new map information based on the location of a reference object present in the new map information received from the target nearby vehicle. Specifically, the control processor 617 determines that the reliability of the new map information has been verified when a difference between a first location value of the reference object present in the new map information received from the target nearby vehicle and a second location value of the reference object obtained as a result of the detection of the reference object by a sensor mounted on the target nearby vehicle is a preset reference value or less.

If it is determined that the reliability of the new map information has been verified, at step S500, the control processor 617 controls autonomous driving of the ego vehicle based on the new map information and the results of the detection of a nearby object by the sensor unit mounted on the ego vehicle. Specifically, the control processor 617 generates a driving trajectory of the ego vehicle and a driving trajectory of the target nearby vehicle by fusing the new map information and the results of the detection of the nearby object by the sensor unit, and then controls autonomous driving of the ego vehicle based on the generated driving trajectories. If it is determined that the reliability of the new map information has not been verified, at step S600, the control processor 617 turns off an autonomous driving mode for safe driving of the ego vehicle, and outputs an alarm to notify a driver of the ego vehicle that an autonomous driving mode needs to switch to a manual driving mode.

As described above, according to the present embodiment, when an abnormality occurs in a function of a processor (i.e., the driving trajectory generation module) for generating a driving trajectory based on map information applied to an autonomous vehicle, new map information can be received from a nearby vehicle, the reliability of the new map information can be verified, and a driving trajectory can be generated normally. Accordingly, normal autonomous driving control can also be performed at all times.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An autonomous driving apparatus for an ego vehicle that autonomously travels, the autonomous driving apparatus comprising:
   a first sensor to detect a vehicle nearby the ego vehicle;
   a memory to store map information; and
   a processor comprising a driving trajectory generator to generate a first driving trajectory of the ego vehicle and a second driving trajectory of the nearby vehicle based on the map information stored in the memory, a trajectory learner to correct the first driving trajectory of the ego vehicle generated by the driving trajectory generator, and a control processor to control autonomous driving of the ego vehicle based on the first and second driving trajectories generated by the driving trajectory generator,
   wherein the driving trajectory generator is configured to:
      generate an actual driving trajectory of the nearby vehicle by making cross reference to a location of the nearby vehicle detected by the first sensor and a given location in the map information stored in the memory, generate an expected driving trajectory of the nearby vehicle as a center line of a lane incorporated into the map information,
      generate an actual driving trajectory of the ego vehicle by making cross reference to a location of the ego vehicle and a given location in the map information stored in the memory, and
      generate an expected driving trajectory of the ego vehicle as a center line of a lane incorporated into the map information,
   wherein the trajectory learner is configured to correct the actual driving trajectory of the ego vehicle by applying trajectory a lateral shift value to the actual driving trajectory of the ego vehicle, when a trajectory error between the actual driving trajectory and the expected driving trajectory of the nearby vehicle is equal to or greater than a preset threshold,
   wherein the control processor is configured to:
      determine whether a function of the driving trajectory generator is abnormal,
      request a target nearby vehicle around the ego vehicle to transmit new map information if it is determined that the function of the driving trajectory generator is abnormal,
      verify reliability of the new map information received from the target nearby vehicle,
      control the autonomous driving of the ego vehicle based on the new map information and results of detection of the nearby vehicle by the first sensor if the reliability of the new map information has been verified, and
      turn off an autonomous driving mode of the ego vehicle and output an alarm to notify a driver of the autonomous driving mode switching to a manual driving mode if the reliability of the new map information has not been verified,
   wherein the control processor is configured to determine that the function of the driving trajectory generator is abnormal when a data value of the first driving trajectory or the second driving trajectory generated by the driving trajectory generator is out of a preset reliability range,
   wherein the control processor is configured to verify the reliability of the new map information based on a location of a reference object present in the new map information received from the target nearby vehicle,
   wherein the control processor is configured to determine that the reliability of the new map information has been verified, when a difference between a first location value of the reference object present in the new map information received from the target nearby vehicle and a second location value of the reference object obtained as a result of detection of the reference object by a second sensor mounted on the target nearby vehicle is equal to or less than a preset reference value,
   wherein the control processor is configured to:
   generate, without the driving trajectory generator, the first driving trajectory of the ego vehicle and the second driving trajectory of the nearby vehicle by fusing the new map information and the results of the detection of the nearby object by the first sensor if the reliability of the new map information has been verified, and
   control the autonomous driving of the ego vehicle based on the generated first and second driving trajectories,
   wherein the nearby vehicle comprises at least two surrounding vehicles.

2. An autonomous driving method for an ego vehicle comprising the steps of:
   controlling autonomous driving of the ego vehicle based on a first driving trajectory of the ego vehicle and a second driving trajectory of a nearby vehicle based on map information stored in a memory, wherein the first and second driving trajectories are generated by a driving trajectory generator;
   determining whether a function of the driving trajectory generator is abnormal;
   requesting a target nearby vehicle around the ego vehicle to transmit new map information if it is determined that the function of the driving trajectory generator is abnormal;
   verifying reliability of the new map information received from the target nearby vehicle;
   controlling the autonomous driving of the ego vehicle based on the new map information and results of detection of the nearby object by a first sensor mounted on the ego vehicle if the reliability of the new map information has been verified, and
   turning off an autonomous driving mode of the ego vehicle and outputting an alarm to notify a driver of the autonomous driving mode switching to a manual driving mode if the reliability of the new map information has not been verified,
   wherein the method further comprises the steps of:
   generating an actual driving trajectory of the nearby vehicle by making cross reference to a location of the nearby vehicle detected by the first sensor and a given location in the map information stored in the memory, generating an expected driving trajectory of the nearby vehicle as a center line of a lane incorporated into the map information, generating an actual driving trajectory of the ego vehicle by making cross reference to a location of the ego vehicle and a given location in the map information stored in the memory, generating an expected driving trajectory of the ego vehicle as a center line of a lane incorporated into the map information, and correcting the actual driving trajectory of the ego vehicle by applying a trajectory lateral shift value to the actual driving trajectory of the ego vehicle, when a trajectory error between the actual driving trajectory and the expected driving trajectory of the nearby vehicle is equal to or greater than a preset threshold, wherein the step of determining whether the driving trajectory generator is abnormal comprises the step of determining that the function of the driving trajectory generator is abnormal when a data value of the first driving trajectory or the second driving trajectory is out of a preset reliability range, wherein the step of verifying the reliability comprises the step of verifying the reliability of the new map information based on a location of a reference object present in the new map information received from the target nearby vehicle, wherein the step of verifying the reliability comprises the step of determining that the reliability of the new map information has been verified, when a difference between a first location value of the reference object present in the new map information received from the target nearby vehicle and a second location value of the reference object obtained as a result of detection of the reference object by a second sensor mounted on the target nearby vehicle is equal to or less than a preset reference value, wherein the step of controlling the autonomous driving of the ego vehicle comprises the steps of:

generating the first driving trajectory of the ego vehicle and the second driving trajectory of the nearby vehicle by fusing the new map information and the results of the detection of the nearby object by the first sensor if the reliability of the new map information has been verified, and controlling the autonomous driving of the ego vehicle based on the generated first and second driving trajectories, wherein the nearby vehicle comprises at least two surrounding vehicles.

* * * * *